(12) United States Patent
Inamdar et al.

(10) Patent No.: US 8,110,634 B2
(45) Date of Patent: Feb. 7, 2012

(54) SULFENAMIDE ACCELERATORS FOR IMPROVED NETWORK STABILIZATION OF RUBBER VULCANIZATES

(75) Inventors: Chandrashekhar Shankar Inamdar, Maharashtra (IN); Chinmoy Nandi, Maharashtra (IN); Narendra Digambar Gangal, Maharashtra (IN)

(73) Assignee: Nocil, Ltd, Mumbai (IN)

( * ) Notice: Subject to any disclaimer, the term of this patent is extended or adjusted under 35 U.S.C. 154(b) by 348 days.

(21) Appl. No.: 12/438,092

(22) PCT Filed: Jul. 23, 2007

(86) PCT No.: PCT/IN2007/000304
§ 371 (c)(1), (2), (4) Date: Feb. 19, 2009

(87) PCT Pub. No.: WO2008/035375
PCT Pub. Date: Mar. 27, 2008

(65) Prior Publication Data
US 2010/0234535 A1    Sep. 16, 2010

(30) Foreign Application Priority Data
Aug. 21, 2006  (IN) .......................... 1312/MUM/2006

(51) Int. Cl.
*C08C 19/20* (2006.01)
(52) U.S. Cl. ............... 525/332.7; 525/332.8; 525/332.9; 525/333.1; 525/333.2
(58) Field of Classification Search ............... 525/332.7, 525/332.8, 332.9, 333.1, 333.2
See application file for complete search history.

(56) References Cited

U.S. PATENT DOCUMENTS 2,996,483 A * 8/1961 Smith, Jr. et al. .............. 525/349
3,223,684 A * 12/1965 Smith, Jr. ...................... 525/349

* cited by examiner

*Primary Examiner* — Robert D. Harlan
(74) *Attorney, Agent, or Firm* — Law Offices of Albert Wai-Kit Chan, PLLC (57) ABSTRACT

Sulfenamide derivatives of 4-alkyl substituted 2-mercapto benzothiazole (4m-MBT) as accelerators used in vulcanizable rubber composition having improved 'Reversion Resistance' and 'Modulus & Hardness Stabilization' properties for sulphur vulcanized tire compounds predominantly based on Natural Rubber or its blends with Polybutadiene (BR) and styrene butadiene rubber (SBR) in which Natural Rubber is the major component thereby improving the overall tire performance, ride safety and tyre service life.

12 Claims, 3 Drawing Sheets

Rheometer (ODR) Test at 140°C, 3°arc

Evaluation of 4m-CBS and 4m-TBBS against MBS, CBS and TBBS in Natural Rubber based Gum Compound at equimolar dosages.

SULFENAMIDE ACCELERATORS FOR IMPROVED NETWORK STABILIZATION OF RUBBER VULCANIZATES

This application is the National Stage of International Application No. PCT/IN2007/000304, filed Jul. 23, 2007, which claims priority of Indian Application No. 1312/MUM/2006, filed Aug. 21, 2006, the entire disclosures of which are hereby incorporated by reference.

FIELD OF INVENTION

This invention relates to a vulcanizable rubber composition stabilized by incorporating an accelerator material of novel sulfenamide accelerators for improved Reversion Resistance and Network stabilization of rubber vulcanizates. More particularly the invention relates to Sulfenamide derivatives of 4-alkyl substituted 2-mercapto benzothiazole as 'Reversion Resistant' and 'Modulus and Hardness Stabilizing' accelerators for sulfur cured Tire compounds predominantly based on Natural Rubber or its blends with synthetic rubbers like Polybutadiene Rubber (BR) and Styrene-Butadiene Rubber (SBR).

BACKGROUND AND PRIOR ART

Conventionally, 2-mercapto benzothiazole (MBT) based derivatives such as Benzothiazyl disulfide (MBTS), N-cyclohexylbenzothiazole-2-sulfenamide (CBS), N-tert-butylbenzothiazole-2-sulfenamide (TBBS), N-oxydiethylenebenzothiazole-2-sulfenamide(MBS) and N,N'-dicyclohexylbenzothiazole-2-sulfenamide(DCBS) are used as accelerators for the sulfur vulcanization of various tire compounds based on Natural Rubber(NR), Styrene-Butadiene Rubber(SBR), Polybutadiene Rubber (BR) or their blends. Under the conditions of high temperature cure deployed for increased productivity of smaller size tyres or longer cure cycles used for relatively thick cross section larger diameter heavy duty tires; these accelerators are known to cause relatively faster 'Reversion' (degradation of polysulfide cross links) and exhibit 'Rapid Changes' in the vulcanizate properties (e.g. Tensile strength, Modulus at lower extensions, Hardness, Tear strength, Flex-fatigue properties and Chipping and chunking resistance etc.) during tire cure, storage and the subsequent service life of the tire due to random scission of network chains, chemical modification of polymer chains, changes in cross link character and cross link density, etc.

The increased Modulus and Hardness on ageing/during tire service affect the tire performance with respect to 'Road Grip' [Drive Safety!], 'Flex-Fatigue Resistance', Tread wear, besides affecting the "Feel" of a New Passenger Car Tire based on Synthetic Rubbers; while the overall performance, 'Chipping and Chunking Resistance' and the Expected Service Life of Truck & Bus Tires, Off The Road Tires (which are predominantly based on Natural Rubber) are seriously affected due to the effects of 'Reversion' and Rapid changes in the Sulfur Cross Link Types and the Cross Link Density'.

The use of 4m-MBTS [2,2'-dithiobis(4-methyl benzothiazole)] derivative of Na salt of 4m-MBT (4-Methyl-2-Mercaptobenzothiazole) as a Modulus Stabilizing Accelerator for sulphur cured tire compounds has been described in European Patent Application EP 0 945 482 A1.

U.S. Pat. No. 5,840,908 describes mono- and bisubstituted benzothiazole sulfenamide compounds based on primary amines may be employed as rubber vulcanization accelerators having excellent scorch safety. Vulcanizable rubber compositions containing rubber, sulfur and the benzothiazole sulfenamide compounds are also provided.

In practice, sulfur vulcanized rubber compounds suffer from the adverse effect of Reversion leading to high hysteresis and subsequently higher heat generation. Heat generation causes rapid tread wear of large truck and off-the-road tyres. In addition to this the tire tread surface gets subjected to longer curing times and hence reversion, to ensure optimum state of cures requirements of the inner sections of the tires. To combat these detrimental effects of reversion, the curing systems employed are with high accelerator/sulfur ratios and thereby improving the reversion resistance since the resulting network is based on more thermally stable cross links. The cross link network formed during the vulcanization process is predominantly polysulphidic and tends to degrade into di & monosulfidic cross links under the influence of heat supplied during prolonged tire vulcanization process, subsequent tire storage and the heat generated during the service of the tire.

These unavoidable circumstances cause rapid changes in the nature & density of cross link matrix affecting the originally designed stress-strain & other vulcanizate properties of the various rubber components when conventional sulfenamide accelerators are used in the tire compounds.

Therefore, there remains a need in the art to develop a novel sulfenamide accelerator as a solution for overcoming the above drawbacks of conventional sulfenamide accelerators and at the same time without any negative effect on the processing, vulcanizing as well as the vulcanizate & performance properties of the tire compounds.

Thus the inventors of the present invention endeavour the shortcomings of the prior art by incorporating the novel sulfenamide derivatives having substitution at 4-position with methyl group as accelerators of sulfur vulcanization and thereby stabilizing the vulcanizate network and provide improved 'Reversion Resistance' to tire compounds predominantly based on Natural Rubber or its blends with Polybutadiene (BR) & Styrene Butadiene (SBR) Rubbers in which Natural rubber is a major component.

These novel sulfenamide accelerators also offer the advantage of 'Modulus and Hardness Stabilization' for sulphur vulcanized tire compounds predominantly based on Natural Rubber or its blends with general purpose synthetic rubbers like BR & SBR and it is expected that the feel of a new tire, its overall performance on the road, ride safety and tire service life will be improved considerably.

OBJECT OF THE INVENTION

The object of the present invention is to provide vulcanizable rubber composition comprising sulfenamide derivatives of 4-alkyl substituted preferably 4 methyl substituted 2-mercapto benzothiazole having 'Reversion Resistant' and 'Modulus & Hardness Stabilizing' properties as accelerators for sulfur cured tire compounds predominantly based on natural rubber.

SUMMARY OF THE INVENTION

The present invention discloses a Sulfur vulcanizable rubber composition comprising a diene rubber and sulphur wherein the rubber composition is stabilized by incorporating a stabilizer/accelerator material of 4-substituted 2-mercapto benzothiazole sulfenamides of the general formula I, (I)

wherein $R_1$ and $R_2$ can be the same or different and each denote hydrogen, halogen, nitro, hydroxy, $C_1$-$C_{12}$ alkyl or alkoxyl or aralkyl, $R_3$ and $R_4$ can be the same or different and each denote hydrogen, $C_1$-$C_{12}$ (cyclo) alkyl or alkoxyl or aralkyl, or $R_3$ and $R_4$ can form a ring, optionally substituted with O, Si, S, and P.

In a preferred aspect of the invention vulcanizable rubber composition comprises sulfenamide accelerator/stabilizer material such as 4-substituted 2-mercapto benzothiazole sulfenamides of formula I, wherein R1 is methyl, R2 is hydrogen, R3 is H and R4 is cyclohexyl group such as N-cyclohexyl-2mercapto-4-methyl-benzothiazole sulfenamide (4m-CBS) (Formula IA).

In an another preferred aspect of the invention a vulcanizable rubber composition comprises 4-substituted 2-benzothiazole sulfenamide of formula I, wherein R1 is methyl, R2 is hydrogen, R3 is H and R4 is tertiary butyl group such as N-tert.butyl-2mercapto-4-methyl-benzothiazole sulfenamide (4m-TBBS) (Formula IB).

The present vulcanizable rubber composition stabilized by incorporating the sulfenamide derivatives of 4-alkyl substituted 2-mercapto benzothiazole (Formula I) as accelerators having 'Reversion Resistant' and 'Modulus & Hardness Stabilizing' properties for sulfur cured tire compounds predominantly based on Natural Rubber.

The following improvements in properties were observed from the detail study on performance of sulfenamide derivative of 4 alkyl substituted 2-mercapto benzothiazole. (Formula I) in the natural rubber based tire tread compound.

Sulfenamide derivative of 4-alkyl substituted 2-mercapto benzothiazole offered much better Reversion Resistance than the conventional sulfenamide accelerators like CBS, TBBS, MBS and DCBS in the natural rubber based tire tread compound.

Sulfenamide derivative of 4-alkyl substituted 2-mercapto benzothiazole offered much better retention of Heat Aged modulus values, hardness and other related vulcanizate properties compared to CBS, TBBS, MBS and DCBS.

DETAILED DESCRIPTION OF THE INVENTION

Figure 1:
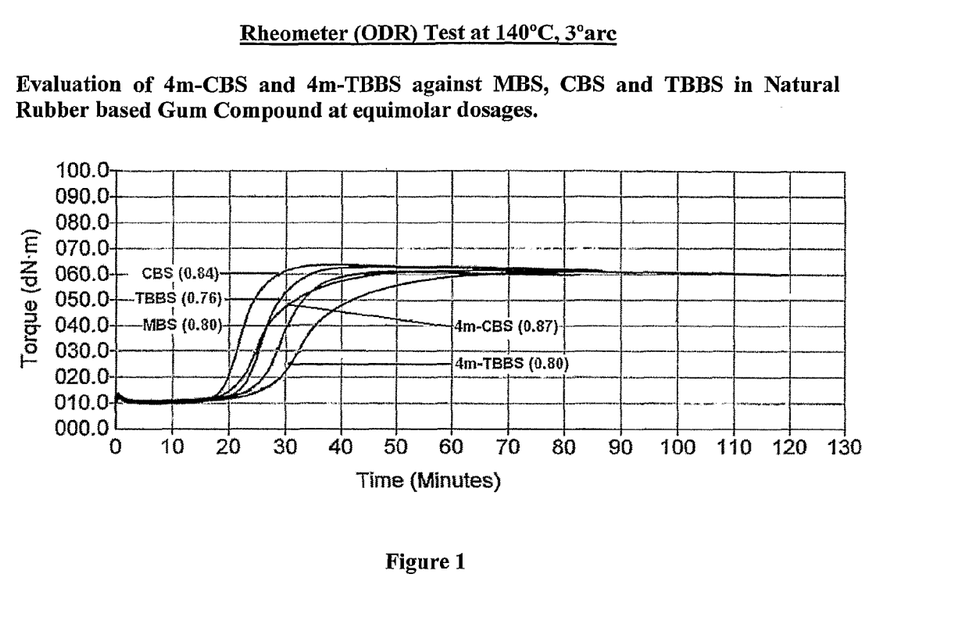
FIG. 1: Results of comparison of vulcanizate properties of CBS, TBBS, and MBS with 4m-CBS and 4m-TBBS in NR Tread Compound which corresponds to Table-1.
Figure 2:
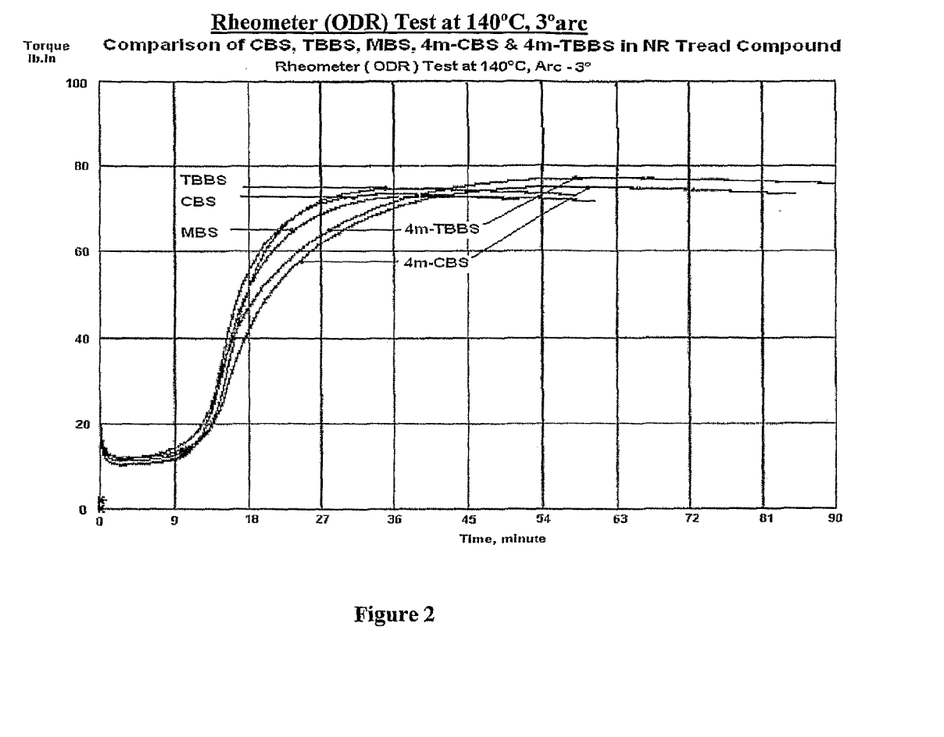
FIG. 2: Results of comparison of vulcanizate properties of DCBS with 4m-CBS and 4m-TBBS in NR Tread Compound which corresponds to Table-2.
Figure 3:
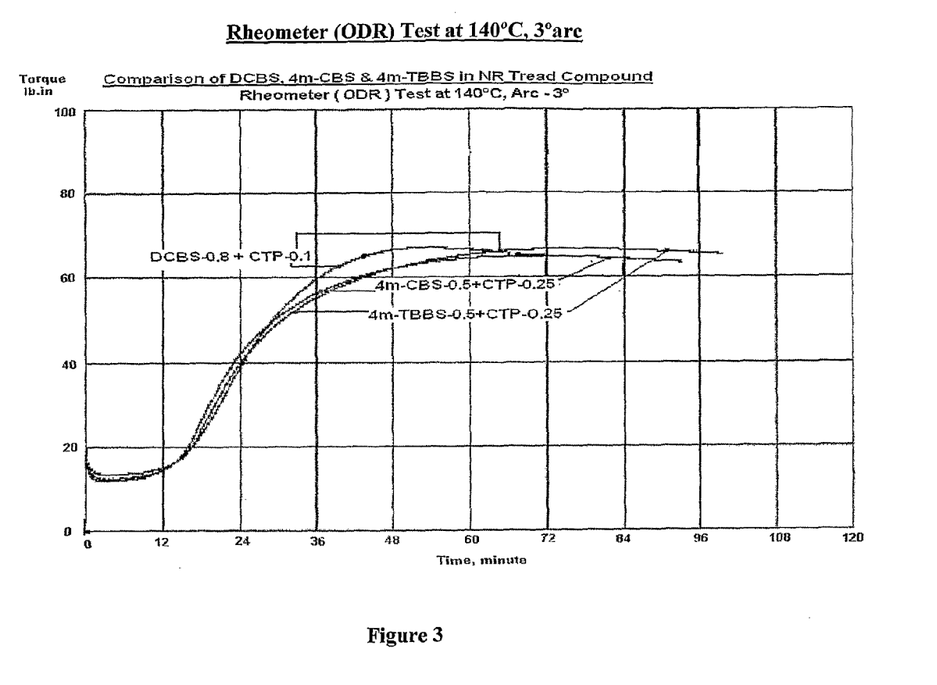
FIG. 3: Results of comparison of DCBS, 4m-CBS & 4m-TBBS in NR Tread Compound.

The present invention describes a vulcanizable rubber composition comprising a diene rubber and sulphur wherein the rubber composition is stabilized by incorporating 4-substituted 2-benzothiazole sulfenamide compounds as stabilizer/accelerator material. Sulfenamide derivatives of 2-mercaptobenzothiazole (MBT) are used as accelerators of vulcanization in the tire compounds based on Natural Rubber or its blends with general purpose synthetic rubbers like Styrene Butadiene rubber (SBR) and Polybutadiene Rubber (BR) using Sulphur as a cross linking agent and zinc oxide & Stearic acid are as cure activators. The crosslink network formed during the vulcanization process is predominantly polysulphidic and tends to degrade into di and monosulfidic cross links under the influence of heat supplied during the tire vulcanization process, subsequent tire storage and the heat generated during the service of the tire. These unavoidable circumstances cause rapid changes in the nature & density of cross link matrix and affect the originally designed stress-strain & other vulcanizate properties of the various rubber compounds used in a tire for its optimal performance and extended service life. Sulfenamide derivatives of 4-alkyl substituted 2-mercapto benzothiazole of formula I which are preferred embodiment of the present invention have now been evaluated for their synergistic action and first time incorporated in vulcanizate rubber composition of the present invention.

According to the invention when these 4-methyl substituted 2-mercapto benzothiazole Sulfenamide compounds are incorporated in vulcanizable rubber composition; they contribute unexpected results with improved properties of 'Reversion Resistance' and 'Modulus & Hardness Stabilizing' of the rubber vulcanizates. These Sulfenamide derivatives have not been used as 'Reversion Resistant' accelerators for stabilizing the Natural Rubber or predominantly Natural Rubber based tire compositions of prior art rubber compounding.

The present vulcanizable Natural Rubber composition is stabilized and strengthened with much better retention of heat aged modulus values, hardness and other related vulcanizate properties compared to CBS, TBBS, MBS and DCBS by incorporating 4-alkyl substituted 2-benzothiazole sulfenamide compounds.

The preferred accelerators used in the invention are N-cyclohexyl-2-mercapto-4-methyl-benzothiazole sulfenamide (4m-CBS) (Formula IA) and N-tert.butyl-2-mercapto-4-methyl-benzothiazole sulfenamide (4m-TBBS) (Formula IB). These accelerators are represented by following structural formula.

(IA)

(IB)

Samples of 4m-CBS & 4m-TBBS accelerators were prepared by controlled reaction (Kelly's process) to produce 4m-MBT which was converted to 4m-NaMBT intermediate by treating with caustic and purified by partial oxidation & solvent extraction, which in turn was converted into sulfenamide by oxidative coupling with respective amines viz Cyclohexyl amine (CHA) and Tertiary Butyl amine (TBA). These were tested for chemical and physical properties and were evaluated in a typical Natural Rubber based Tire Tread compound. The relevant details are given below:

| Physical and Chemical Properties of 4m-CBS & 4m-TBBS: | | |
|---|---|---|
| Properties | 4m-CBS | 4m-TBBS |
| Colour | Tan yellow | Tan yellow |
| Specific gravity @ 25° C. | 1.45 | 1.30 |
| Melting Point (Final), ° C. | 86 | 72 |
| Moisture content, % | 0.1 | 0.2 |
| Ash Content, % | 0.1 | 0.2 |
| Assay, % | 97.0 | 96.0 |
| Methanol Insoluble, % | 0.1 | 0.1 |
| Free Amine, % | 0.4 | 0.15 |
| Molecular Weight | 278 | 252 |

These accelerators are used in sulfur based vulcanization systems to generate Natural Rubber based vulcanizates which provided improved Reversion Resistance and Retention of Physical and Dynamic properties during evaluation.

The present invention also describes a method of stabilizing the Natural Rubber based vulcanizate network by incorporating these novel sulfenamide accelerators and thus obtain optimum state of cure for the vulcanizate of various tire rubber compositions to the desired target property before as well as after ageing at room or high temperatures. The same concept can be applied for the manufacture of other rubber products requiring protection against Reversion and better retention of vulcanizate properties on heat ageing.

In this application, the abbreviation "phr" means the number of parts by weight per 100 parts by weight of rubber. The rubber compounds are based on 100 parts by weight of total rubber hydrocarbon content in the recipe.

Either natural rubber (NR), Styrene-Butadiene Rubber (SBR), Polybutadiene Rubber (BR) or a blend of NR and SBR or NR and BR with one or more other rubbers can be used in the invention process; it being understood that for purposes of this invention the term "rubber" means an elastomer containing a hydrocarbon unit which is a polymer with large proportions of unsaturated chemical bonds. Typically, SBR, a blend of SBR with Natural rubber (NR), a blend of SBR with Polybutadiene rubber (BR), or a blend of SBR with NR and BR is used. The type of rubber or the composition of blend of rubbers will have some influence on the precise dosage of accelerator to be used.

Typically, the amount of accelerator employed in the rubber composition of the present invention will be at least about 0.5 phr. The preferred upper limit is about 5.0 phr, most preferably 1.0 phr.

A typical rubber composition in accordance with the present invention comprises a rubber, about 0.1 to about 5 phr of sulfur, about 0.5 to about 1 phr of a Novel vulcanization accelerator of the invention and a $C_{12}$-$C_{20}$ fatty acid such as Stearic acid, metal oxides such as zinc oxide and other compounding ingredients that are typically added to rubber compositions.

The rubber composition of the present invention typically also comprises reinforcing filler in a conventional amount. Any carbon black or combination of carbon black with precipitated silica may be used.

Conventional rubber additives may also be included in the sulfur-vulcanizable rubber composition in accordance with the present invention. The conventional additives such as processing oils, tackifiers, waxes, antioxidants, resins, para-phenylenediamine antiozonants, and vulcanization activators, such as Stearic acid and zinc oxide may be added in amounts known to the person skilled in the art of rubber compounding. The reader is also referred to the examples that are described below.

From the detail study of the invention on use of 4m-CBS and 4m-TBBS in rubber vulcanization process, the following improved performance were found which hitherto not known.

The dosages of 4m-CBS and 4m-TBBS can be adjusted in combination with CTP to obtain desired processing and curing properties.

4m-CBS offered longer 'Reversion Time' compared to conventional sulfenamide accelerators CBS, TBBS, MBS & DCBS in the Natural Rubber based Tire Tread compound.

4m-CBS and 4m-TBBS offered much better retention of Heat Aged Modulus values, Hardness and other related vulcanizate properties compared to CBS, TBBS, MBS & DCBS.

The better performance of 4m-CBS and 4M-TBBS as compared to other conventional sulfenamides is probably due to Electron donating (inductive) effect of Methyl group which stabilizes the S—N bond causing Scorch delay. Hyper conjugative (hydrogen radical formation) effect of benzylic methyl group helps to trap free radicals of sulfur and hence better Reversion Resistance & Hardness stabilization of Rubber vulcanizates on Heat ageing.

The following examples, which include preferred embodiments, will serve to illustrate the practice of this invention, it being understood that the particulars shown are by way of example and for purpose of illustrative discussion of preferred embodiments of the invention.

EXAMPLES

Example 1

Evaluation of 4m-CBS and 4m-TBBS against MBS, CBS and TBBS in Natural Rubber based Gum Compound.

The base formulation of NR gum compound and the equimolar dosages (equivalent to 0.80 phr MBS) of sulfenamide accelerators CBS, TBBS, 4m-CBS & 4m-TBBS evaluated for cure characteristics are given in the table below.

| NR Gum Compound & Equimolar Sulfenamide dosages. Base Compound: NR- 100, ZnO- 5, St. acid- 2, 6PPD- 1, Sulfur- 2. (Total-110) | | | | | |
|---|---|---|---|---|---|
| Compounds | MBS | CBS | TBBS | 4m-CBS | 4m-TBBS |
| MBS | 0.80 | — | — | — | — |
| CBS | — | 0.84 | — | — | — |
| TBBS | — | — | 0.76 | — | — |
| 4m-CBS | — | — | — | 0.87 | — |
| 4m-TBBS | — | — | — | — | 0.80 |

Test Results

TABLE 1

| Compounds | MBS | CBS | TBBS | 4m-CBS | 4m-TBBS |
| --- | --- | --- | --- | --- | --- |
| Mooney Viscosity and Mooney Scorch Tests | | | | | |
| Mooney Viscosity, $ML_{1+4}$ @ 100° C., units | 39.0 | 39.5 | 40.0 | 40.0 | 40.0 |
| Mooney Scorch, MS @ 121° C. | | | | | |
| t5, min | 35.42 | 30.39 | 34.83 | 32.93 | 39.95 |
| t35, min | 41.66 | 33.89 | 40.78 | 38.10 | 48.60 |
| (t35 − t5), min | 6.23 | 3.51 | 5.94 | 5.17 | 8.65 |
| Rheometer (ODR) @ 140° C., 3° arc. | | | | | |
| Minimum Torque (ML), dN·m | 10.08 | 9.86 | 10.41 | 10.79 | 10.54 |
| Maximum Torque (MH 100), dN·m | 61.01 | 63.72 | 62.88 | 61.53 | 61.03 |
| (Max − Min) Torque (MH 100 − ML), dN·m | 50.93 | 53.86 | 52.47 | 50.74 | 50.49 |
| Reversion Torque, M98, N·m | 59.79 | 62.45 | 61.62 | 60.30 | 59.81 |
| Reversion Time, t98, min. | 81.41 | 73.70 | 84.00 | 91.20 | 120.00 |
| Scorch Time: tS2, min. | 19.62 | 16.86 | 19.88 | 18.41 | 22.52 |
| Time to 50% Cure: t'c50, min. | 29.42 | 22.17 | 26.11 | 25.81 | 33.78 |
| Time to 90% Cure: t'c90, min. | 33.39 | 25.15 | 29.68 | 32.72 | 42.86 |
| Time to 100% Cure: t'c100, min | 50.13 | 40.41 | 46.88 | 65.89 | 83.66 |
| Cure Rate (t'c90 − tS2), min | 16.65 | 10.64 | 12.49 | 19.91 | 28.05 |
| Vulcanizate Properties: Cure, t'90 @ 140° C. | | | | | |
| Modulus @ 300% Elongation, MPa | 2.70 | 2.80 | 3.00 | 2.70 | 2.85 |
| Elongation @ Break, % | 760 | 740 | 725 | 750 | 740 |
| Tensile Strength, MPa | 27.00 | 27.30 | 27.90 | 26.20 | 26.50 |
| Hardness, IRHD | 43 | 44 | 44 | 43 | 44 |
| Tear Strength, kN/m | 34.0 | 37.0 | 38.0 | 37.0 | 38.0 |
| Vulcanizate Properties: Cure, 4 x t'90 @ 140° C. | | | | | |
| Modulus @ 300% Elongation, MPa | 2.40 | 2.50 | 2.60 | 2.50 | 2.60 |
| Elongation @ Break, % | 750 | 730 | 720 | 750 | 740 |
| Tensile Strength, MPa | 18.80 | 19.00 | 19.60 | 20.80 | 20.90 |
| Hardness, IRHD | 41 | 43 | 43 | 41 | 42 |
| Tear Strength, kN/m | 26.00 | 27.00 | 27.00 | 32.00 | 32.00 |
| Change in . . . | | | | | |
| 300% Modulus, % | −11.1 | −10.7 | −13.3 | −7.4 | −8.8 |
| EB, % | −1.3 | −1.4 | −0.7 | 0.0 | 0.0 |
| Tensile strength, % | −30.4 | −30.4 | −29.7 | −20.6 | −21.1 |
| Hardness, IRHD | −2 | −1 | −1 | −2 | −2 |
| Tear Strength, % | −23.5 | −27.0 | −28.9 | −13.5 | −15.8 |

Example 2

Evaluation of Vulcanizate Properties of 4m-CBS and 4m-TBBS Against CBS, TBBS and MBS in a Typical Natural Rubber Based Tire Compound

| Master Batch | |
|---|---|
| Ingredients | Parts by weight |
| Natural Rubber (RSS1) | 100.0 |
| Zinc Oxide | 5.0 |
| Stearic Acid | 2.0 |
| N-1,3-Dimethylbutyl-N'-phenyl paraphenylene diamine (6 PPD) | 2.5 |
| 2,2,4-Trimethyl-1,2-dihydroquinoline polymer (TMQ) | 0.5 |
| N 330 black | 50.0 |
| Highly Aromatic oil | 5.0 |
| Sulfur | 2.3 |
| Total | 167.3 |

| Compounds | CBS | TBBS | MBS | 4m-CBS | 4m-TBBS |
|---|---|---|---|---|---|
| CBS | 0.70 | — | — | — | — |
| TBBS | — | 0.60 | — | — | — |
| MBS | — | — | 0.80 | — | — |
| 4m-CBS | — | — | — | 0.90 | — |
| 4m-TBBS | — | — | — | — | 0.90 |
| N-(Cyclohexylthio)-phthaliamide (CTP) | 0.20 | 0.20 | 0.15 | 0.20 | 0.10 |

Note:
Compound MBS is the 'Control' compound with typical MBS & CTP dosages. The dosages of CBS, TBBS, 4m-CBS and 4m-TBBS have been adjusted to get the 'Rheometer Max. Torque Values' similar to MBS compound.

Test Results

TABLE 2

| | CBS | TBBS | MBS | 4m-CBS | 4m-TBBS |
|---|---|---|---|---|---|
| Mooney Scorch Test at 121° C. | | | | | |
| Minimum Viscosity, units | 30.5 | 32.0 | 34.0 | 36.5 | 36.5 |
| Scorch Time (t5), min. | 33.0 | 35.5 | 40.0 | 40.0 | 35.0 |
| Cure Time (t35), min. | 37.0 | 40.0 | 46.0 | 47.0 | 44.0 |
| Cure Rate (t35 − t5), minute | 4.0 | 4.5 | 6.0 | 7.0 | 9.0 |
| Rheometer (ODR) Test at 140° C., Arc-3° | | | | | |
| Minimum Torque (ML), lb · in | 10.31 | 10.51 | 11.37 | 12.13 | 12.02 |
| Maximum Torque (MH 100), lb · in | 73.51 | 73.11 | 74.72 | 74.97 | 77.1 |
| (Max − Min) Torque (MH 100 − ML), lb · in | 63.2 | 62.6 | 63.35 | 62.84 | 65.08 |
| Reversion Torque, M 98, lb · in | 72.04 | 71.65 | 73.23 | 73.47 | 75.56 |
| Reversion Time, t98, min. | 51.06 | 60.33 | 57.92 | 84.95 | 94.42 |
| Scorch Time: tS2, min. | 9.85 | 9.63 | 9.82 | 10.13 | 8.58 |
| Time to 50% Cure: tc50, min. | 15.58 | 16.15 | 16.68 | 18.45 | 17.28 |
| Time to 90% Cure: tc90, min. | 22.92 | 25.08 | 23.87 | 33.82 | 34.48 |
| Cure Rate Index = 100/(tc90 − tS2) | 7.65 | 6.47 | 7.12 | 4.22 | 3.86 |
| Vulcanizate Properties (Unaged) Cure: 45' @ 140° C. | | | | | |
| Tensile Strength, MPa | 27.80 | 29.00 | 29.80 | 28.00 | 28.00 |
| Elongation @ Break, % | 510 | 525 | 535 | 510 | 475 |
| 200% Modulus, MPa | 9.0 | 9.7 | 9.8 | 10.0 | 10.2 |
| 300% Modulus, MPa | 15.3 | 15.9 | 16.0 | 16.2 | 16.4 |
| Hardness, Shore A ° | 64 | 65 | 65 | 65 | 65 |
| Vulcanizate Properties (Aged @ 85° C.-96 hr) Cure: 45' @ 140° C. | | | | | |
| Tensile Strength, MPa | 23.5 | 23.4 | 24.8 | 22.5 | 22.5 |
| Elongation @ Break, % | 410 | 420 | 420 | 435 | 425 |
| 200% Modulus, MPa | 11.8 | 11.6 | 12.6 | 10.5 | 11.0 |
| 300% Modulus, MPa | 18.1 | 17.7 | 18.5 | 16.5 | 17.1 |
| Hardness, Shore A ° | 70 | 69 | 71 | 66 | 66 |
| Tensile Strength Retention, % | 84.5 | 80.7 | 83.2 | 80.4 | 80.4 |
| Elongation @ Break Retention, % | 80.4 | 80.0 | 78.5 | 85.3 | 89.5 |
| Change in 200% Modulus, % | 31.1 | 19.6 | 28.6 | 5.0 | 7.8 |
| Change in 300% Modulus, % | 18.3 | 11.3 | 15.6 | 1.9 | 4.3 |
| Change in Hardness, units | 6 | 4 | 6 | 1 | 1 |

Example 3

Evaluation of Vulcanizate Properties of 4m-CBS & 4m-TEES against DCBS in NR Tread Compound

| Master Batch | |
|---|---|
| Ingredients | Parts by weight |
| Natural Rubber (RSS1) | 100.0 |
| Zinc Oxide | 5.0 |
| Stearic Acid | 2.0 |
| N-1,3-Dimethylbutyl-N'-phenyl paraphenylene diamine (6 PPD) | 2.5 |
| 2,2,4-Trimethyl-1,2-dihydroquinoline polymer (TMQ) | 0.5 |
| N 330 black | 50.0 |
| Highly Aromatic oil | 5.0 |
| Sulfur | 2.3 |
| Total | 167.3 |

| Compounds | DCBS | 4m-CBS | 4m-TBBS |
|---|---|---|---|
| DCBS | 0.80 | — | — |
| 4m-CBS | — | 0.50 | — |
| 4m-TBBS | — | — | 0.50 |
| N-(Cyclohexylthio)-phthaliamide (CTP) | 0.10 | 0.25 | 0.25 |

Note:
Compound DCBS is the 'Control' compound with typical DCBS & CTP dosages. The dosages of 4m-CBS and 4m-TBBS have been adjusted to get the 'Rheometer Max. Torque Values' similar to DCBS compound.

Test Results

TABLE 3

| Compounds | DCBS | 4m-CBS | 4m-TBBS |
|---|---|---|---|
| Mooney Scorch test at 121° C. | | | |
| Minimum | 35.5 | 37.5 | 39.5 |
| t5, min. | 41.0 | 46.0 | 47.5 |
| t35, min. | 50.5 | 54.5 | 57.0 |
| t35 – t5, minute | 9.5 | 8.5 | 9.5 |
| Rheometer (ODR) Test at 140° C., Arc-3° | | | |
| Minimum Torque (ML), lb. in | 11.82 | 12.38 | 12.29 |
| Maximum Torque (MH 100), lb. in | 67.04 | 65.12 | 66.69 |
| (Max – Min) Torque (MH 100 – ML), lb. in | 55.22 | 52.74 | 54.4 |
| Reversion Torque, M 98, lb. in | 65.70 | 63.82 | 65.36 |
| Reversion Time, t98, min. | 66.08 | 90.63 | 99.20 |
| Scorch Time: tS2, min. | 11.15 | 11.78 | 12.58 |
| Time to 50% Cure: tc50, min. | 24.22 | 22.52 | 24.12 |
| Time to 90% Cure: tc90, min. | 37.9 | 41.93 | 46.03 |
| Cure Rate Index = 100/(tc90 – tS2) | 3.74 | 3.32 | 2.99 |
| Vulcanizate Properties (Unaged) Cure: 45' @ 140° C. | | | |
| Tensile Strength, MPa | 28.0 | 28.2 | 28.5 |
| Elongation @ Break, % | 560 | 570 | 600 |
| 200% Modulus, MPa | 8.4 | 7.5 | 7.4 |
| 300% Modulus, MPa | 14.0 | 13.2 | 12.8 |
| Hardness, Shore A° | 65 | 63 | 63 |
| Vulcanizate Properties (Aged @ 85° C.-96 hr) Cure: 45' @ 140° C. | | | |
| Tensile Strength, MPa | 22.2 | 21.6 | 21.4 |
| Elongation @ Break, % | 440 | 485 | 470 |
| 200% Modulus, MPa | 10.9 | 8.6 | 8.7 |
| 300% Modulus, MPa | 16.8 | 13.8 | 13.8 |
| Hardness, Shore A° | 70 | 65 | 65 |
| Tensile Strength Retention, % | 79.3 | 76.6 | 75.1 |
| Elongation @ Break Retention, % | 78.6 | 85.1 | 78.3 |
| Change in 200% Modulus, % | 29.8 | 14.7 | 17.6 |
| Change in 300% Modulus, % | 20.0 | 4.5 | 7.8 |
| Change in Hardness, units | 5 | 2 | 2 |

RESULTS AND DISCUSSION

4m-CBS offers 23.7% longer reversion time than CBS, 8.6% longer reversion time than TBBS and 12.0% longer reversion time than MBS in Natural rubber gum compound at 140° C.

4m-TBBS offers 62.8% longer reversion time than CBS, 42.9% longer reversion time than TBBS and 47.0% longer reversion time than MBS in Natural rubber gum compound at 140° C.

4m-CBS offered 46% longer reversion time compared to MBS and 37% longer reversion time compared to DCBS in the Natural Rubber based Tire Tread compound.

4m-TBBS offered 62% longer reversion time compared to MBS and 50% longer reversion time compared to DCBS in the Natural Rubber based Tire Tread compound.

4m-CBS & 4m-TBBS offer much better retention of Heat Aged Modulus values, Hardness and other related vulcanizate properties compared to CBS, TBBS, MBS & DCBS.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A vulcanizable rubber composition comprising a diene rubber and sulphur wherein said composition is stabilized by incorporating a stabilizer/accelerator material selected from a group of 4-substituted 2-benzothiazole sulfenamides of the general formula I,

(I)

wherein $R_1$ and $R_2$ can be the same or different and are chosen from the group consisting of hydrogen, halogen, nitro, hydroxy, $C_1$-$C_{12}$ alkyl, $C_1$-$C_{12}$ alkoxyl and $C_1$-$C_{12}$ aralkyl; $R_3$ and $R_4$ can be the same or different and are chosen from the group consisting of hydrogen, $C_1$-$C_{12}$ alky, $C_1$-$C_{12}$ cycloalkyl, $C_1$-$C_{12}$ alkoxyl and $C_1$-$C_{12}$ aralkyl; or $R_3$ and $R_4$, together with the N they are attached to, form a ring, optionally substituted with O, Si, S, and P.

2. The vulcanizable rubber composition of claim 1, wherein said accelerator/stabilizer material is 4-substituted 2-benzothiazole sulfenamide, wherein $R_1$ is methyl, $R_2$ is hydrogen, $R_3$ is H, and $R_4$ is cyclohexyl group.

3. The vulcanizable rubber composition of claim 1 wherein said accelerator/stabilizer material is 4-substituted 2-benzothiazole sulfenamide, wherein $R_1$ is methyl, $R_2$ is hydrogen, $R_3$ is H, and $R_4$ is tertiary-butyl.

4. The vulcanizable rubber composition of claim 1, wherein said accelerator/stabilizer material is N-cyclohexyl-4-methyl-2-benzothiazole sulfenamide (4m-CBS) (IA).

(IA)

5. The vulcanizable rubber composition of claim 1 wherein said accelerator/stabilizer material is N-tert-butyl-4-methyl-2-benzothiazole sulfenamide (4m-TBBS) (IB).

(IB)

6. The vulcanizable rubber composition of claim 4, wherein said composition has better reversion resistance and modulus and hardness stabilizing properties than natural rubber-based tire composition treated with CBS, TBBS, MBS or DCBS.

7. The vulcanizable rubber composition of claim 5, wherein said composition has better reversion resistance and modulus and hardness stabilizing properties than natural rubber-based tire composition treated with CBS, TBBS, MBS or DCBS.

8. The vulcanizable rubber composition of claim 6, wherein said composition has longer reversion time compared to natural rubber-based tire composition treated with MBS or DCBS.

9. The vulcanizable rubber composition of claim 7 wherein said composition has longer reversion time compared to natural rubber-based tire composition treated with MBS or DCBS.

10. The vulcanizable rubber composition of claim 6, wherein said composition has much better retention of Heat Aged modulus values, hardness and other related vulcanizate properties compared to natural rubber-based tire composition treated with CBS, TBBS, MBS or DCBS.

11. The vulcanizable rubber composition of claim 7, wherein said composition has much better retention of Heat Aged modulus values, hardness and other related vulcanizate properties compared to natural rubber-based tire composition treated with CBS, TBBS, MBS or DCBS.

12. The vulcanizable rubber composition of claim 1, wherein said accelerator/stabilizer material is used in an amount ranging from 0.5 to 5.0 parts by weight per 100 parts by weight of rubber.

* * * * *